United States Patent Office.

TRAUGOTT SANDMEYER, OF BASLE, SWITZERLAND, ASSIGNOR TO JOHN R. GEIGY & CO., OF SAME PLACE.

PROCESS OF MAKING AURIN DERIVATIVES.

SPECIFICATION forming part of Letters Patent No. 410,739, dated September 10, 1889.

Application filed March 12, 1889. Serial No. 303,021. (Specimens.)

*To all whom it may concern:*

Be it known that I, TRAUGOTT SANDMEYER, of Basle, Switzerland, have invented a certain new and useful Process for the Production of Triphenylmethan Colors, (dyeing with the aid of mordants,) of which the following is a specification.

My invention has reference to the synthesis of tricarbonic acids of aurin by oxidation of salicylic acid and one of the following methane derivatives, as methyl-alcohol, formaldehyde, methylal-dioxydiphenyl-methandicarbonic acid, dioxyditolylmethendicarbonic acid in a solution of sulphuric acid with the help of nitrous acid.

To carry out my invention, for instance, two parts of salicylic acid are dissolved in fifteen parts of concentrated sulphuric acid and four parts of methyl-alcohol. This solution is heated to about 70° centigrade and then one and one-half part of nitrite of sodium is added. By and by the solution obtains a green metal-like color. It is then poured into water, by which the new product is precipitated. After washing it is saturated with an alkali and dried.

As a second example I give the following description: fourteen parts of dioxydiphenyl-methandicarbonic acid obtained by condensation of salicylic acid with methylal or formaldehyde, with the help of muriatic acid, are well mixed with seven parts of salicylic acid and gradually added to a mixture of ninety parts of concentrated sulphuric acid with seven parts of nitrite of sodium. The new product is then treated as mentioned in the first example.

As a third example I give the following description: In taking formaldehyde or methylal instead of methyl-alcohol, one part of dry nitrite of sodium is dissolved in ten parts of concentrated sulphuric acid. To this solution two parts of salicylic acid are added, whereupon while stirring 0.5 part of a thirty per cent. solution of formaldehyde or 0.4 part of methylal are gradually poured into the mixture.

All these examples furnish the same coloring-matter, for which the following is the formula:

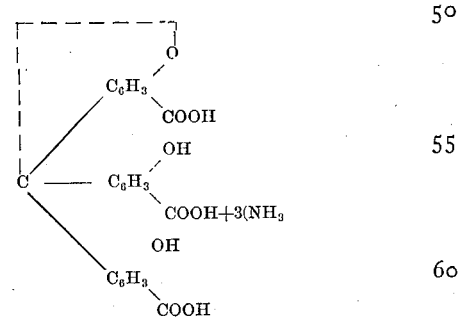

This new substance is red powder with greenish reflections. It dissolves in caustic soda with brown and in ammonia with red color. Mineral acids precipitate it, but acetic acid does not. Oxides of metals form lakes. The chromine lake is fast to soap and of a beautiful red violet tint. Similar colors, but of a bluer shade, can be obtained by taking cresotine acid instead of salicylic acid or its products of condensation with formaldehyde.

Having now described my invention, I claim as new and desire to secure by Letters Patent—

The process for the production of colors by first taking two parts of salicylic acid dissolved in fifteen parts of concentrated sulphuric acid and four parts of methyl-alcohol, then heated to about 70° centigrade, after which one and one-half part of nitrite of sodium is added. It is then poured into water by which the new product is precipitated. It is then washed, after which it is saturated with an alkali and dried, substantially as described.

In testimony whereof I hereunto sign my name, in the presence of two subscribing witnesses, this 1st day of March, 1889.

TRAUGOTT SANDMEYER.

Witnesses:
GEORGE GIFFORD,
CHS. A. RICHTER.